Ela Calley's Improvement in applying
a Circular Saw to its Shaft.

74749

PATENTED
FEB 25 1868

Witnesses
S. N. Piper
John R. Snow

Ela Calley
by his attorney
R. H. Eddy

United States Patent Office.

ELA CALLEY, OF FRANKLIN, NEW HAMPSHIRE.

Letters Patent No. 74,749, dated February 25, 1868.

IMPROVEMENT IN MODE OF ATTACHING CIRCULAR SAWS TO THEIR MANDRELS.

The Schedule referred to in these Letters Patent and making part of the same.

TO ALL PERSONS TO WHOM THESE PRESENTS MAY COME:

Be it known that I, ELA CALLEY, of Franklin, in the county of Merrimack, and State of New Hampshire, have invented a new and useful Improvement in Applying a Circular Saw to its Shaft; and do hereby declare the same to be fully described in the following specification, and represented in the accompanying drawings, of which—

Figure 1:
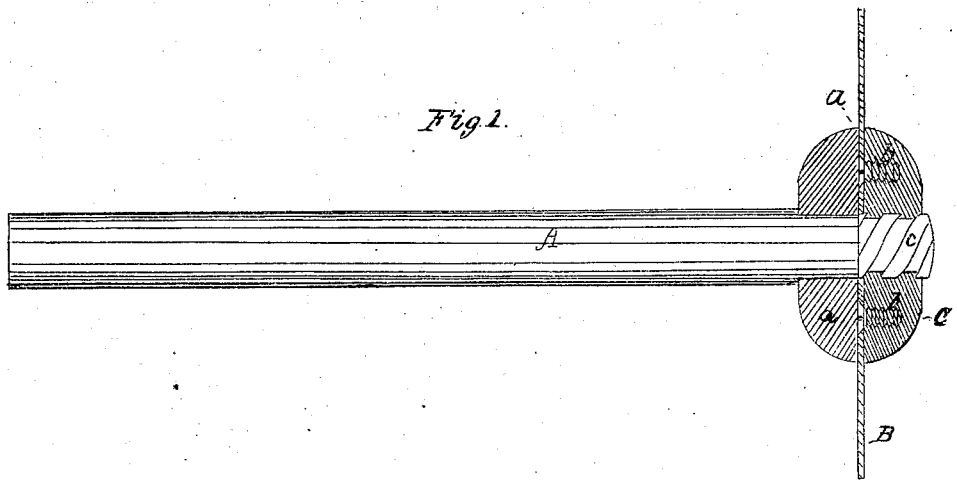
Figure 1 is a longitudinal section of a saw and its shaft, as connected in accordance with my invention.
Figure 2:
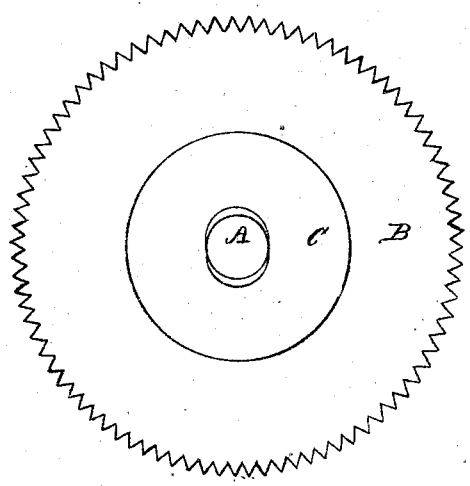
Figure 2 is an end view of the shaft with the saw applied thereto.

The object of my improvement is to enable the saw to be either readily removed from it or readily fixed upon the shaft or arbor.

For this purpose I form the shafts A of the saw B with an annular shoulder, $a$, for the saw to rest against when encompassing the said shaft. I also affix to the outer face of the saw, by means of screws $b\ b$, a screw-nut, C, adapted to a double-threaded screw, $c$, which I cut on that part of the arbor which projects from the shoulder $a$, goes through the saw, and extends beyond it. When the saw is close against the shoulder $a$, it will cover the heads of the screws $b\ b$, and thus estop such screws from working loosely in the nut. By means of the nut and its screws $b\ b$, saws of different sizes may be readily applied to the shaft without the necessity of having a separate nut for every saw.

I am aware that it is not new to connect a chuck or other article with an arbor by means of a screw and shoulder on such arbor; therefore I make no claim thereto; but

What I claim as my invention, is—

The arrangement of the separate nut C and its confining-screws $b\ b$, shaft A, the male screw $c$, and the shoulder $a$, applied to such shaft in the manner and for the purpose substantially as specified.

ELA CALLEY.

Witnesses:
R. H. EDDY,
F. P. HALE, Jr.